(12) United States Patent
Lukac

(10) Patent No.: US 10,002,408 B2
(45) Date of Patent: Jun. 19, 2018

(54) RESTORING COLOR AND INFRARED IMAGES FROM MOSAIC DATA

(71) Applicant: Intel Corporation, Santa Clara, CA (US)

(72) Inventor: Rastislav Lukac, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/228,606

(22) Filed: Aug. 4, 2016

(65) Prior Publication Data
US 2018/0040104 A1 Feb. 8, 2018

(51) Int. Cl.
*G06T 5/00* (2006.01)
*G06T 11/60* (2006.01)
*G06T 7/40* (2017.01)
*H04N 9/64* (2006.01)

(52) U.S. Cl.
CPC .............. *G06T 5/001* (2013.01); *G06T 7/408* (2013.01); *G06T 11/60* (2013.01); *H04N 9/646* (2013.01); *G06T 2207/20172* (2013.01)

(58) Field of Classification Search
CPC .......... G06T 5/001; G06T 7/408; G06T 11/60; G06T 5/003; G06T 2207/10004; H04N 9/646; H04N 5/23229
See application file for complete search history.

(56) References Cited

U.S. PATENT DOCUMENTS

2013/0027591 A1* 1/2013 Lukac ............... H01L 27/14623
348/242
2015/0317776 A1* 11/2015 Sugimoto ............. H04N 5/357
348/241

* cited by examiner

*Primary Examiner* — Ruiping Li
(74) *Attorney, Agent, or Firm* — Jordan IP Law, LLC

(57) ABSTRACT

Methods, apparatuses and systems may provide for creating a reference signal for a restoration process using a plurality of pixels corresponding to various color channels within a spatial neighborhood of a target pixel location. Additionally, first weights may be set in pixel locations within the spatial neighborhood to control contributions of pixel values and values of the reference signal in calculating one or more intermediate restoration factors. Moreover, second weights may be set in pixel locations within the spatial neighborhood to control contributions of the intermediate restoration factors in calculating one or more final restoration factors. In one example, at least one of the one or more final restoration factors and the reference signal are combined in the target pixel location to restore one or more values in the target pixel location.

24 Claims, 4 Drawing Sheets

RESTORING COLOR AND INFRARED IMAGES FROM MOSAIC DATA

BACKGROUND

Digital cameras may capture color information using a color filter array (CFA) placed on top of an image sensor. A common CFA type is a Bayer array, which is based on a repetitive 2×2 pattern comprising one red (R), two green (G), and one blue (B) filters, with R and B color filters on one diagonal and two G color filters on the other diagonal. Recently introduced RGB-IR (red, green, blue-infrared) hybrid sensors may enhance this concept by capturing simultaneously both color information in the visible spectrum using traditional R, G, and B color filters and infrared (IR) information using IR filters, thus reducing the cost of the imaging system and the area required for multiple sensors. Generating a full color RGB image from RGB-IR data may involve a data filtering, interpolation, demosaicking, or restoration process. It is also possible to first generate the Bayer CFA image from RGB-IR data and then apply some Bayer demosaicking method to produce a full-color RGB image. Generating an IR image may involve extracting the IR pixels from RGB-IR data.

Technical challenges related to processing RGB-IR data may include the flexibility to operate with an arbitrary RGB-IR CFA layout, such as 2×2 and 4×4 repetitive CFA patterns and various other CFA layouts that may exist in future hybrid RGB-IR sensors. Other challenges may be related to image quality and computational efficiency. With respect to image quality, the results produced may include various color (for RGB processing) and edge artifacts (for both RGB and IR processing), whose presence typically depends on the scene complexity and processing performance, for instance.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Pixel restoration apparatuses as described herein may provide a framework to restore images captured using, for example, a single RGB-IR sensor. Depending on the use case, the proposed framework may output high-quality RGB (in Bayer CFA and/or full-color RGB formats) and IR images at low to medium computational cost. The framework may be used to support different sensors and different color filter arrays (CFAs), including the CFAs used in traditional RGB sensors. In one example, low-pass filtering is first applied to RGB-IR CFA data to create a luminance-like image that does not suffer from the underlying mosaic pattern seen in the CFA image. This luminance image may be considered as a "reference signal" that is used to guide the restoration processes.

Figure 1A:
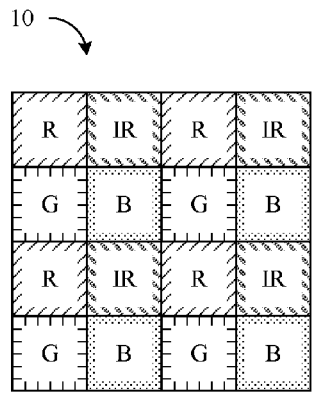
FIGS. 1A and 1B are illustrations of color filter arrays according to embodiments.
Figure 1B:
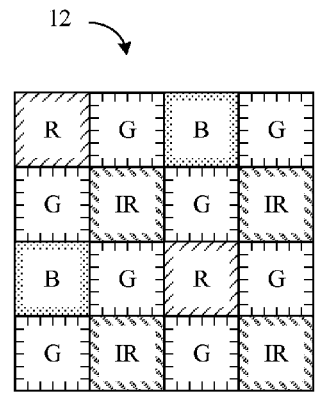
Figure 2:
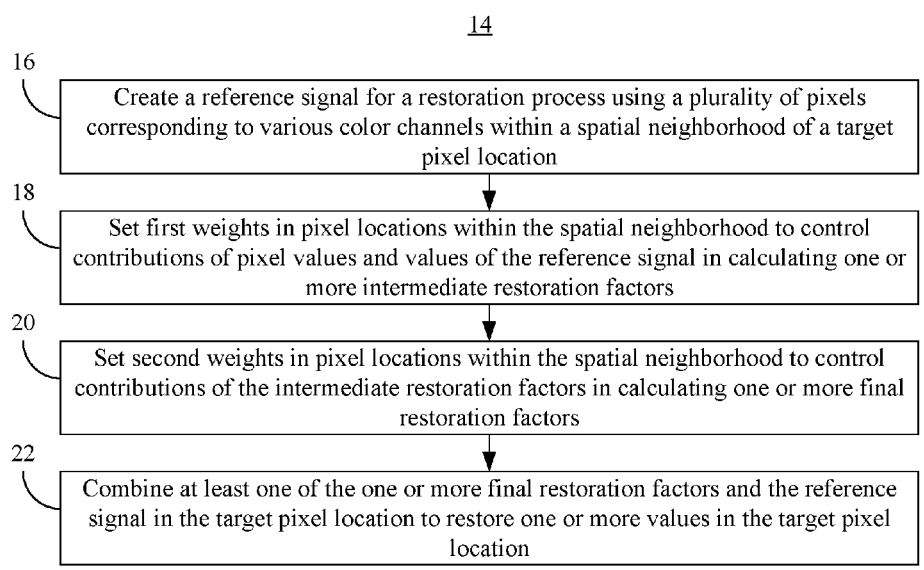
FIG. 2 is a flowchart of an example of a method of operating a pixel restoration apparatus.

With continuing reference to FIGS. 1A, 1B and 2, a method 14 of operating a pixel restoration apparatus is shown. The method 14 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 16 aims at creating a reference signal (e.g., a luminance image) for a restoration process using a plurality of pixels corresponding to various color channels within a spatial neighborhood of a target pixel location. In one example embodiment, the luminance image is created for a 2×2 repetitive pattern, such as a 2×2 RGB-IR CFA pattern 10, by applying a 3×3 filter mask [1 2 1; 2 4 2; 1 2 1]/16, which gives similar aggregated contributions of R, G, B, and IR pixels in each pixel location. In another example embodiment, the luminance image is created for a 4×4 repetitive pattern, such as a 4×4 RGB-IR CFA pattern 12, by applying a 3×3 filter mask [1 2 1; 2 4 2; 1 2 1]/16 in G and IR locations and a 5×5 kernel mask [0 0 1 0 0; 0 2 4 2 0; 1 4 4 4 1; 0 2 4 2 0; 0 0 1 0 0]/32 in R and B locations to overcome, respectively, a lack of B and R pixels inside 3×3 neighborhoods in certain pixel locations. In another example embodiment, the luminance is obtained as a combination of average values corresponding to each type of color pixels inside a predefined local window. The contribution of individual pixels to the average values may be controlled by the weights, where the weights may have the same value or the weight values may reduce with increased spatial distance from the actual pixel location. In another example embodiment, the luminance is approximated by an enlarged version of a selected color channel or the combination of multiple color channels.

In yet another example embodiment, the obtained luminance values may be enhanced or otherwise processed prior to their use in the restoration process. For example, the luminance image can be subject to noise reduction to improve the signal-to-noise characteristics of the luminance image. To compensate for low-pass effects associated with some of the proposed luminance formation processes, image sharpening may be desired, for example, with thresholding being applied to the high-pass filtered luminance signal to suppress the noise. Eventually, the luminance image may be subject to detail restoration by combining it with a detail layer extracted from individual color channels (i.e., sub-images) of the CFA image by virtue of the low-pass filtering. Thus, block 16 may include enhancing the reference signal using one or more of noise reduction, sharpening or detail restoration. Moreover, block 16 may include combining local average or weighted average values corresponding to the various color channels, or by enlarging a weighted combination of different color pixels in non-overlapping or overlapping blocks.

Formally, in each pixel location, the luminance value $L=\text{sum}(w_i x_i)$, (Equation 1), may be calculated as a weighted average of the pixels $x_i$ inside a filter window centered around the actual pixel location. The value i=1, 2, 3, . . . , N denotes the pixel index (using this notation, $x_{(N+1)/2}$ is the actual pixel), N is the number of neighboring pixels to be averaged (N=9 for a 3×3 mask, N=25 for a 5×5 mask, or N=13 for the above 5×5 mask without zero coefficients). The value of $w_i$ denotes the weight associated with the sample $x_i$; for example, $w_i=1/16$ for i=1, 3, 7, 9, $w_i=2/16$ for i=2, 4, 6, 8, and $w_i=4/16$ for i=5 in case of a 3×3 mask discussed above. The luminance-like image is used to provide cross-channel correlation in the restoration process and to obtain edge-adaptive weights to minimize the appearance of edge and/or color artifacts in restored images.

In one example embodiment, the goal is to convert RGB-IR CFA data to the Bayer CFA image. Since most imaging pipelines are designed and optimized for the sensor covered by the Bayer CFA, this approach can reduce development, implementation, and tuning efforts. To minimize the impact on image quality, the proposed framework replaces all IR pixels and only those of R, G, and B pixels that do not follow the Bayer CFA format, thus restoring only one color component per non-Bayer CFA location. In another example embodiment, the goal may be to restore the full-color RGB information from RGB-IR CFA data, thus producing two missing color components at any R, G, and B CFA pixel locations and all three color components at IR CFA pixel locations. In yet another example embodiment, the goal might be to output the IR image, which can be as simple as extracting IR pixels in order to output the IR image in its native resolution or more complex should the dimensions of the IR image match the dimensions of the CFA image. In this latter case, one IR value per R, G, and B CFA pixel location is produced.

The following concept is a simplified version of data-adaptive filtering, adapted here to restore the Bayer CFA image from the RGB-IR CFA image in a computationally efficient manner. In one example embodiment, a Bayer CFA image is restored from a RGB-IR CFA image based on the 2×2 pattern 10. In this case, the procedure replaces all IR pixels with the estimated G samples. Four original G samples, diagonally adjacent to the actual (target) pixel location, are subject to weighted averaging as $y=L+sum(w_i(x_i-L_i))/sum(w_i)$, (Equation 2), for i=1, 2, 3, 4. The neighborhood size may be increased as needed in order to allow more samples for averaging.

The edge-adaptive weights are calculated as $w_i=1/(1+|L-L_i|^p)$, (Equation 3), where L is the luminance value of the actual pixel location, p is a design parameter (e.g., p=1 for absolute differences and p=2 for square differences). Omitting the cross-channel correlation reduces the above calculation to $y=sum(w_ix_i)/sum(w_i)$, (Equation 4), omitting the spatial correlation results in $y=L+sum(x_i-L_i)/4$, (Equation 5), and omitting both cross-channel and spatial correlations gives $y=sum(x_i)/4$, (Equation 6). While such reduced calculations may be more attractive from the implementation perspective, they may be avoided to minimize various color and edge artifacts in the output images.

In another example embodiment, the restoring the Bayer CFA image from the RGB-IR CFA image based on the 4×4 pattern 12 involves replacing all pixels in IR CFA locations with the estimated R or B samples. This choice may depend on the type of the color component to be retained in the row and columns which do not contain any IR pixels. If the R components are to be retained, then B components are estimated in IR CFA locations and R components are estimated in B CFA locations. Alternatively, if the B components are to be retained, then R components are estimated in IR CFA locations and B components are estimated in R CFA locations. Since R components may be more important for human perception than B components, the first option may be more preferable in order to preserve as much of captured visual information as possible. As before, using both cross-channel and spatial correlations results in Equation 2, with weights calculated as in Equation 3.

When the restoration is applied in B or R CFA locations, the nearest R or B samples, respectively, are located two pixels away from the actual location in both horizontal and vertical directions and thus i=1, 2, 3, 4. When the restoration is applied in IR CFA locations, the nearest R or B samples are diagonally adjacent to the IR CFA location in one of the two diagonal directions and thus i=1, 2. The neighborhood size may be increased as needed in order to allow more samples for averaging.

In yet another embodiment, addition and subtraction operations in Equation 2 might be replaced with multiplication and division operations, respectively, resulting in $y=L*sum(w_i(x_i/L_i))/sum(w_i)$, (Equation 7). In another example embodiment, the procedure defined in Equation 2 or Equation 7 is used to generate a full-color RGB image (by producing two missing color components at any R, G, and B CFA pixel locations and all three color components at IR CFA pixel locations) and/or an IR image with enhanced spatial resolution (by producing one IR value per R, G, and B CFA pixel location).

In yet another example embodiment, a generalized version of guided filtering is introduced to restore a Bayer CFA image, a color RGB image, and/or an IR image with enhanced spatial resolution from the RGB-IR CFA data. The local statistics, such as mean, covariance, and variance values, are calculated in each local neighborhood as $S_C=sum(w_iC_i)/sum(w_i)$, (Equation 8); $S_L=sum(w_iL_i)/sum(w_i)$, (Equation 9); $S_{CL}=sum(w_iC_iL_i)/sum(w_i)-S_CS_L$, (Equation 10); and $S_{LL}=sum(w_iL_i^2)/sum(w)-S_LS_L$, (Equation 11), where i=1, 2, 3, . . . , N, with N denoting the number of pixels of the same type (i.e., C stands for R, G, B, or IR). These statistics are used to determine parameters $a=S_{CL}/S_{LL}$, (Equation 12), and $b=S_C-aS_L$. (Equation 13).

The average version of these parameters can be calculated as $S_a=sum(w_ia_i)/sum(w_i)$, (Equation 14), and $S_b=sum(w_ib_i)/sum(w_i)$, (Equation 15), where i=1, 2, 3, . . . , N, with N denoting now the number of all pixels inside the neighborhood. As before, the weights $w_i$ can be adaptively calculated using the luminance image or its enhanced version as Equation 3 for instance, and/or calculated based on the spatial distance between the neighboring pixel locations and the actual pixel location. Alternatively, the weights can be omitted (e.g., set to one) in either local statistics or average parameter calculations, or even in both these processes for processing speed improvements. Note that the neighborhood size and the weight formulations/settings used to calculate local statistics can differ from those used to obtain the average parameters. The output pixel $y=S_aL+S_b$, (Equation 16), is determined by applying the average parameters to the actual luminance value L.

In yet another example embodiment, a generalized version of data normalization using mean and standard deviation is introduced to perform the restoration process. In this case, the local statistics, such as mean and standard deviation values, are calculated in each local neighborhood using Equations 8 and 9 for mean values, and $sqrt(S_{LL})$ and $sqrt(S_{CC})$ as standard deviation values, where $S_{LL}$ is obtained in Equation 11 and $S_{CC}=sum(w_iC_i^2)/sum(w_i)-S_CS_C$, (Equation 17). These statistics may be used to determine the following parameters: $v=S_L$, (Equation 18); $d=sqrt(S_{CC}/S_{LL})$, (Equation 19); and $e=S_C$, (Equation 20), with their average versions expressed as $S_v$=sum($w_i v_i$)/sum($w_i$), (Equation 21); $S_d$=sum($w_i d_i$)/sum($w_i$), (Equation 22); and $S_e$=sum($w_i e_i$)/sum($w_i$), (Equation 23), for i=1, 2, 3, ..., N. Following the normalization concept, the output pixel can be calculated by combining the actual luminance value and the average parameters as y=(L−$S_v$)$S_d$+$S_e$, (Equation 24).

Depending on the approach used to generate the luminance image and the type/amount of edge enhancement applied to the luminance image, the restored image may undergo some enhancement in order to compensate for possible low-pass characteristics of the luminance image (which are beneficial to reduce the noise during the restoration process). In one example embodiment, restored images are subject to image sharpening (e.g., Laplacian filtering, unsharp masking, or some other suitable technique) applied to the luminance component or individual color channels. In another example embodiment, the edge information is enhanced using the luminance version of the restored image and previously generated luminance values. In yet another embodiment, image details are restored by combining each color channel of the restored image with the ratios between the original CFA image and its restored version.

Depending on the use case, the restored Bayer CFA image or color RGB image can be subject to IR contribution removal in order to maintain the desired color accuracy. This process usually involves some calibration effort in order to accurately determine the amount of IR contribution per R, G, and B color channel, particularly for sensor modules where these contributions vary across the image plane. Similarly, the IR image may be subject to ambient light removal.

The proposed restoration solution does not put any limit on the number of samples for averaging or the size of the local neighborhood; the settings chosen to facilitate previous discussions are for demonstration purposes only. The samples used to conduct averaging may be preselected based on some predetermined criteria (e.g., several best candidate samples with the highest-ranked weights or the weights exceeding some threshold, etc.). Following the concept of nonlocal processing, the proposed solution also permits the use of samples from distant image areas. Moreover, the pixel differences used in weight calculations may be replaced with block differences and the weight function presented in this document may be replaced with some other suitable functions that produce the highest weight values for zero pixel/block difference and zero or close to zero values for large pixel/block differences. These data-adaptive weights may be combined with the weights reflecting the spatial distance between the candidate pixel locations and the actual pixel location or replaced with the fixed weights (e.g., spatially dependent or otherwise predetermined). The proposed framework may be readily adopted to work with other CFAs, including those that do not use IR filters.

Thus, block 18 may set first weights in pixel locations within the spatial neighborhood to control contributions of pixel values and values of the reference signal in calculating one or more intermediate restoration factors. In one example, the first weights of block 18 are $w_i$ in Equations 2, 7, 8 through 11, and 17, already discussed. Additionally, block 20 may set second weights in pixel locations within the spatial neighborhood to control contributions of the intermediate restoration factors in calculating one or more final restoration factors. In one example, the second weights of block 18 are $w_i$ in Equations 14, 15, and 21 through 23, already discussed. Similarly, another set of $w_i$ values may be used on top of weighted averages in Equations 2 and 7, already discussed.

Additionally, the first and second weights may be set using one or more of predetermined weights (e.g., default, user, and/or manufacturer settings), pixel location-selective weights, weights reflecting a spatial distance between the target pixel location and the neighboring locations, or data-adaptive weights based on differences between values of the reference signal in the target pixel location and the neighboring pixel locations. In this regard, typical cases of pixel location-selective weights may include all pixel locations within the spatial neighborhood, pixel locations corresponding to a selected color channel, and the target (actual) pixel location only. Moreover, the weights reflecting the spatial distance between the target pixel location and the neighboring locations may be Gaussian-like weights, with the largest weight value in the target pixel location and the smallest weight value in the pixel location farthest away from the target pixel location within the spatial neighborhood.

In addition, examples of the data-adaptive weights might include Equation 3, and weights calculated as $w_i$=1/(1+k|L−$L_i$|$^p$), (Equation 25); $w_i$=1/(1+k|L−$L_i$|)$^p$, (Equation 26); $w_i$=exp(−k|L−$L_i$|$^p$), (Equation 27); and $w_i$=2/(1+exp(−k|L−$L_i$|$^p$)), (Equation 28); where k is a scaling value. The weight may also be subject to enhancement, e.g., $w_i$=max($w_i$, w_min), (Equation 29), where w_min is a predetermined minimum weight.

The intermediate restoration factors may include weighted reference signal values sum($w_i L_i$)/sum($w_i$), (Equation 30), weighted square reference signal values sum($w_i L_i^2$)/sum($w_i$), (Equation 31), weighted pixel values sum($w_i C_i$)/sum($w_i$), (Equation 32), weighted square pixel values sum($w_i C_i^2$)/sum($w_i$), (Equation 33), and/or weighted reference signal values multiplied with pixel values, expressed as sum($w_i C_i L_i$)/sum(w), (Equation 34), for instance.

The intermediate restoration factors may also include weighted pixel differences between the pixel values and the values of the reference signals, expressed as sum($w_i(x_i−L_i)$)/sum($w_i$), (Equation 35), and/or weighted pixel ratios between the pixel values and the values of the reference signal, expressed as sum($w_i(x_i/L_i)$)/sum($w_i$), (Equation 36), for example.

The intermediate restoration factors may also include scaling factors expressed as ratios a=$S_{CL}/S_{LL}$, (Equation 37), between covariance and variance values (or their approximations), such as, for example: $S_C L$=sum($w_j C_j L_j$)/sum($w_j$)−$S_C S_L$, (Equation 38), and $S_{LL}$=sum($w_i L_i^2$)/sum($w_i$)−$S_L S_L$, (Equation 39).

In another example, the intermediate restoration factors may include offsets expressed as a difference between weighted pixel values and weighted reference signal values multiplied with scaling factors, such as, for example, b=$S_C$−a$S_L$, (Equation 40).

The intermediate restoration factors may also include square root values of ratios between variance values (or their approximations) corresponding to the pixel values and the reference signal, for instance, sqrt($S_{CC}/S_{LL}$), (Equation 41), where $S_{CC}$=sum($w_i C_i^2$)/sum($w_i$)−$S_C S_C$, (Equation 42).

The final restoration factors may include the weighted version of any of suitable intermediate restoration factors discussed above, with weights obtained using one or more approaches discussed previously. Typical examples include, but are not limited to, weighted average of the factors obtained in Equations 35 or 36, or Equation 37 with 40, or Equation 41 with 30 and 32. The actual calculations of the local statistics and/or any of combined statistics previously discussed may be replaced with some equivalent calculations, which may include fast implementation approaches and suitable approximations.

Thus, illustrated block 22 combines at least one of the one or more final restoration factors and the reference signal in the target pixel location to restore one or more values in the target pixel location. The combination may be represented, for example, as an addition of the reference signal to the final pixel difference: L+weighted average of $sum(w_i\ (x_i-L_i))/sum(w_i)$, (Equation 43); or a first multiplication of the reference signal value by the final pixel ratio: $L*$weighted average of $sum(w_i\ (x_i/L_i))/sum(w_i)$, (Equation 44); or a second multiplication of the reference signal value by the final scaling factor and then an addition of the final offset to a result of the second multiplication: $S_aL+S_b$ equivalent to $L*sum(w_ia_i)/sum(w_i)+sum(w_ib_i)/sum(w_i)$, (Equation 45); or a subtraction of the final reference signal value from the reference signal value and a third multiplication of a result of the subtraction with a final square root value and then an addition of the final color-channel value: $(L-S_v)S_d+S_e$ equivalent to $(L-sum(w_iv_i)/sum(w_i))*sum(w_id_i)/sum(w_i)+sum(w_ie_i)/sum(w_i)$, (Equation 46).

Additionally, blocks 18, 20, and 22 may be conducted/done only in selected pixel locations and/or for selected color channels, wherein the selected pixel locations and/or the selected color channels are variable. For example, the restoration factors for G channels might be calculated only in G CFA pixel locations to reduce the calculations and memory requirements. Block 22 may also enhance the restored values using one or more of noise reduction, sharpening or detail restoration. For example, image details might be restored by combining each color channel of the restored image with the ratios between the original CFA image and its restored version.

Figure 3:
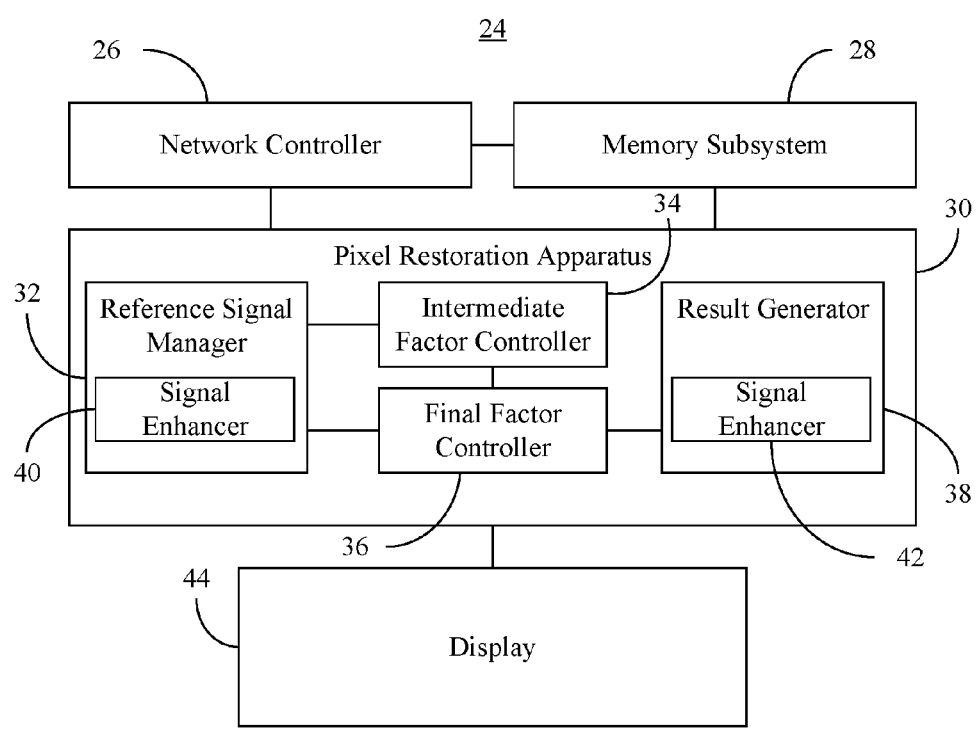
FIG. 3 is a block diagram of an example of an image presentation system according to an embodiment.

Turning now to FIG. 3, an image presentation system 34 is shown. The illustrated system 34 includes a network controller 26 (e.g., wireless and/or wired communication interface) to obtain images, a memory subsystem 28 (e.g., cache, registers, system memory, non-volatile memory/NVM, flash memory) to store the images and a pixel restoration apparatus 30 communicatively coupled to the network controller 26 and the memory subsystem 28. The pixel restoration apparatus 30 may generally implement one or more aspects of the method 14 (FIG. 2), already discussed. More particularly, the pixel restoration apparatus 30 may include a reference signal manager 32 to create a reference signal for a restoration process using a plurality of pixels corresponding to various color channels within a spatial neighborhood of a target pixel location. The apparatus 30 may also include an intermediate factor controller 34 communicatively coupled to the reference signal manager 32, the intermediate factor controller 34 to set first weights in pixel locations within the spatial neighborhood to control contributions of pixel values and values of the reference signal in calculating one or more intermediate restoration factors. The illustrated apparatus 30 also includes a final factor controller 36 communicatively coupled to the reference signal manager 32 and the intermediate factor controller 34, wherein the final factor controller 36 sets second weights in pixel locations within the spatial neighborhood to control contributions of the intermediate restoration factors in calculating one or more final restoration factors. Additionally, a result generator 38 may be communicatively coupled to the final factor controller 36. The result generator 38 may combine at least one of the one or more final restoration factors and the reference signal in the target pixel location to restore one or more values in the target pixel location.

In one example, the reference signal manager 32 includes a signal enhancer 40 to enhance the reference signal using noise reduction, sharpening, detail restoration, etc., or any combination thereof. Additionally, the result generator 38 may include signal enhancer 42 to enhance the restored values using noise reduction, sharpening, detail restoration, etc., or any combination thereof. The output of the result generator 38 may be visually presented on a display 44.

Figure 4:
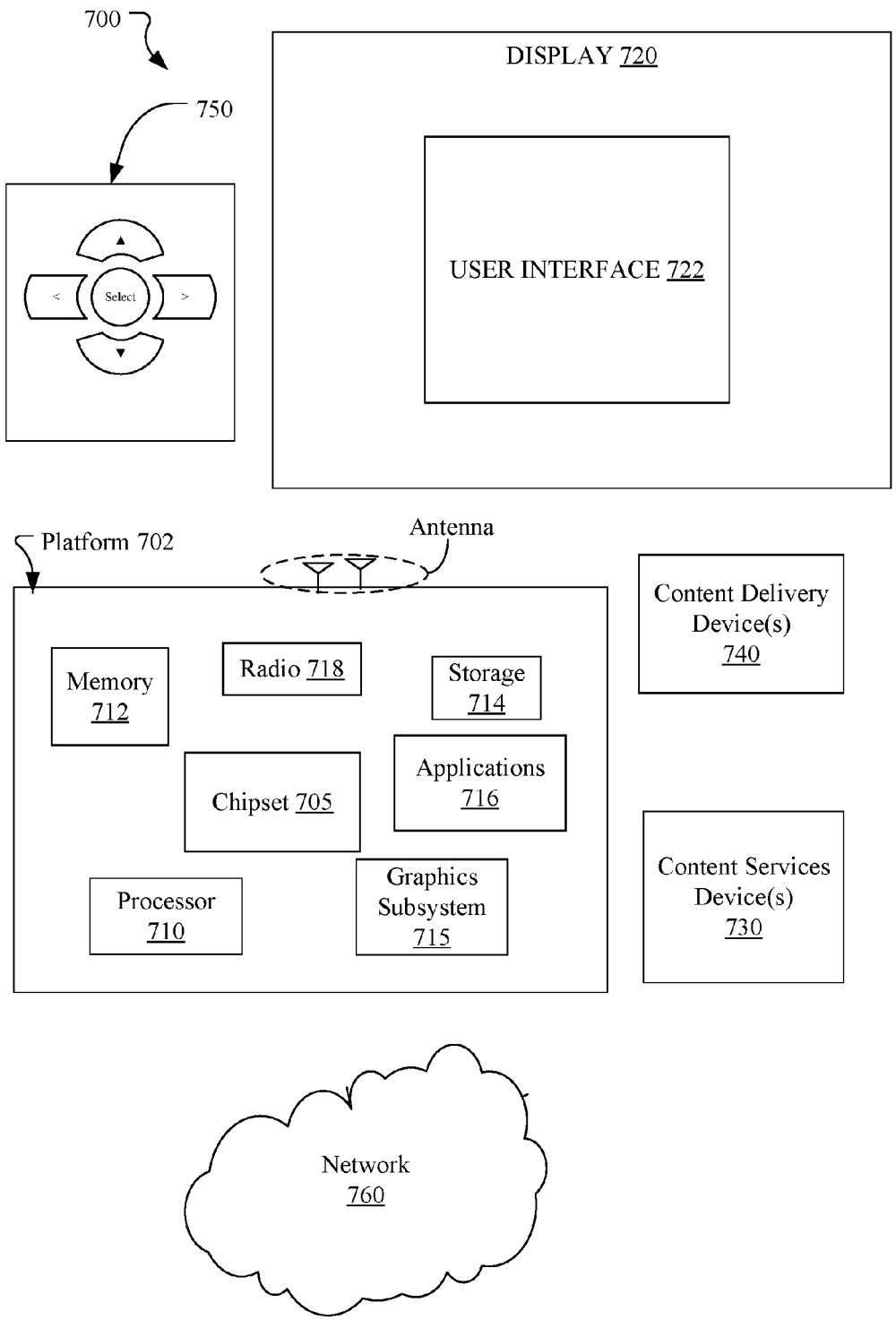
FIG. 4 is a block diagram of an example of a system having a navigation controller according to an embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off" In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O)

adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 5:
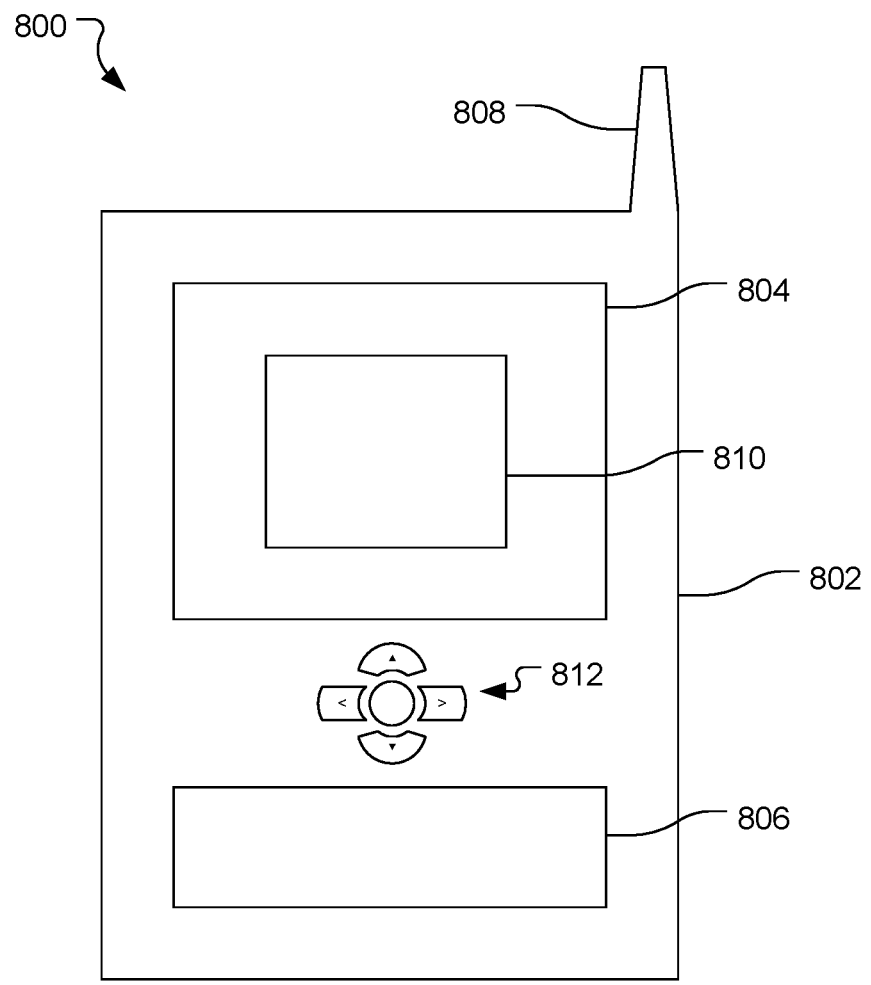
FIG. 5 is a block diagram of an example of a system having a small form factor according to an embodiment.

As described above, the system 700 may be embodied in varying physical styles or form factors. FIG. 5 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

ADDITIONAL NOTES AND EXAMPLES

Example 1 may include an image presentation system comprising a network controller to obtain images, a memory subsystem communicatively coupled to the network controller, the memory subsystem to store the images, and a pixel restoration apparatus comprising a reference signal manager to create a reference signal for a restoration process using a plurality of pixels corresponding to various color channels within a spatial neighborhood of a target pixel location, an intermediate factor controller communicatively coupled to the reference signal manager, the intermediate factor controller to set first weights in pixel locations within the spatial neighborhood to control contributions of pixel values and values of the reference signal in calculating one or more intermediate restoration factors, a final factor controller communicatively coupled to the reference signal manager and the intermediate factor controller, the final factor controller to set second weights in pixel locations within the spatial neighborhood to control contributions of the intermediate restoration factors in calculating one or more final restoration factors, and a result generator communicatively coupled to the final factor controller, the result generator to combine at least one of the one or more final restoration factors and the reference signal in the target pixel location to restore one or more values in the target pixel location.

Example 2 may include the system of Example 1, wherein the reference signal is to be created using at least one predetermined filter mask, by combining local average or weighted average values corresponding to the various color channels, or by enlarging a weighted combination of different color pixels in non-overlapping or overlapping blocks.

Example 3 may include the system of Example 2, wherein the reference signal generator includes a signal enhancer to enhance the reference signal using one or more of noise reduction, sharpening, or detail restoration.

Example 4 may include the system of any one of Examples 1 to 3, wherein the first and second weights are to be set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

Example 5 may include a pixel restoration apparatus comprising a reference signal manager to create a reference signal for a restoration process using a plurality of pixels corresponding to various color channels within a spatial neighborhood of a target pixel location, an intermediate factor controller communicatively coupled to the reference signal manager, the intermediate factor controller to set first weights in pixel locations within the spatial neighborhood to control contributions of pixel values and values of the reference signal in calculating one or more intermediate restoration factors, a final factor controller communicatively coupled to the reference signal manager and the intermediate factor controller, the final factor controller to set second weights in pixel locations within the spatial neighborhood to control contributions of the intermediate restoration factors in calculating one or more final restoration factors, and a result generator communicatively coupled to the final factor controller, the result generator to combine at least one of the one or more final restoration factors and the reference signal in the target pixel location to restore one or more values in the target pixel location.

Example 6 may include the apparatus of Example 5, wherein the reference signal is to be created using at least one predetermined filter mask, by combining local average or weighted average values corresponding to the various color channels, or by enlarging a weighted combination of different color pixels in non-overlapping or overlapping blocks.

Example 7 may include the apparatus of Example 6, wherein the reference signal generator includes a signal enhancer to enhance the reference signal using one or more of noise reduction, sharpening, or detail restoration.

Example 8 may include the apparatus of any one of Examples 5 to 7, wherein the first and second weights are to be set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

Example 9 may include the apparatus of any one of Examples 5 to 7, wherein the intermediate and final restoration factors are to include one or more of weighted reference signal values, weighted square reference signal values, weighted pixel values, weighted square pixel values, weighted reference signal values multiplied with pixel values, weighted pixel differences between the pixel values and the values of the reference signals, pixel ratios between the pixel values and the values of the reference signal, scaling factors expressed as ratios between covariance and variance values, offsets expressed as a difference between weighted pixel values and weighted reference signal values multiplied with scaling factors, or square root values of ratios between variance values corresponding to the reference signal and variance values corresponding to the pixel values.

Example 10 may include the apparatus of any one of Examples 5 to 7, wherein combining one or more final restoration factors and the reference signal in the target pixel is to include one of an addition of the reference signal to the final pixel difference, a first multiplication of the reference signal value by the final pixel ratio, a second multiplication of the reference signal value by the final scaling factor and then an addition of the final offset to a result of the second multiplication, or a subtraction of the final reference signal value from the reference signal value and a third multiplication of a result of the subtraction with a final square root value and then an addition of a final color-channel value.

Example 11 may include the apparatus of any one of Examples 5 to 7, where setting the first weights, setting the second weights, and combining at least one of the one or more final restoration factors and the reference signal in the target pixel location is done only in selected pixel locations and/or for selected color channels, wherein the selected pixel locations and/or the selected color channels are variable.

Example 12 may include the apparatus of any one of Examples 5 to 7, wherein the result generator includes a signal enhancer to enhance the restored values using one or more of noise reduction, sharpening, or detail restoration.

Example 13 may include a method of operating a pixel restoration apparatus, comprising creating a reference signal for a restoration process using a plurality of pixels corresponding to various color channels within a spatial neighborhood of a target pixel location, setting first weights in pixel locations within the spatial neighborhood to control contributions of pixel values and values of the reference signal in calculating one or more intermediate restoration factors, setting second weights in pixel locations within the spatial neighborhood to control contributions of the intermediate restoration factors in calculating one or more final restoration factors, and combining at least one of the one or more final restoration factors and the reference signal in the target pixel location to restore one or more values in the target pixel location.

Example 14 may include the method of Example 13, wherein the reference signal is created using at least one predetermined filter mask, by combining local average or weighted average values corresponding to the various color channels, or by enlarging a weighted combination of different color pixels in non-overlapping or overlapping blocks.

Example 15 may include the method of Example 14, further including enhancing the reference signal using one or more of noise reduction, sharpening, or detail restoration.

Example 16 may include the method of any one of Examples 13 to 15, wherein the first and second weights are set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

Example 17 may include at least one computer readable storage medium comprising a set of instructions which, when executed by a computing device, cause the computing device to create a reference signal for a restoration process using a plurality of pixels corresponding to various color channels within a spatial neighborhood of a target pixel location, set first weights in pixel locations within the spatial neighborhood to control contributions of pixel values and values of the reference signal in calculating one or more intermediate restoration factors, set second weights in pixel locations within the spatial neighborhood to control contributions of the intermediate restoration factors in calculating one or more final restoration factors, and combine at least one of the one or more final restoration factors and the reference signal in the target pixel location to restore one or more values in the target pixel location.

Example 18 may include the at least one computer readable storage medium of Example 17, wherein the reference signal is to be created using at least one predetermined filter mask, by combining local average or weighted average values corresponding to the various color channels, or by enlarging a weighted combination of different color pixels in non-overlapping or overlapping blocks.

Example 19 may include the at least one computer readable storage medium of Example 18, wherein the instructions, when executed, cause a computing device to enhance the reference signal using one or more of noise reduction, sharpening, or detail restoration.

Example 20 may include the at least one computer readable storage medium of any one of Examples 17 to 19, wherein the first and second weights are to be set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

Example 21 may include the at least one computer readable storage medium of any one of Examples 17 to 19, wherein the intermediate and final restoration factors are to include one or more of weighted reference signal values, weighted square reference signal values, weighted pixel values, weighted square pixel values, weighted reference signal values multiplied with pixel values, weighted pixel differences between the pixel values and the values of the reference signals, pixel ratios between the pixel values and the values of the reference signal, scaling factors expressed as ratios between covariance and variance values, offsets expressed as a difference between weighted pixel values and weighted reference signal values multiplied with scaling factors, or square root values of ratios between variance values corresponding to the reference signal and variance values corresponding to the pixel values.

Example 22 may include the at least one computer readable storage medium of any one of Examples 17 to 19, wherein combining one or more final restoration factors and the reference signal in the target pixel is to include one of an addition of the reference signal to the final pixel difference, a first multiplication of the reference signal value by the final pixel ratio, a second multiplication of the reference signal value by the final scaling factor and then an addition of the final offset to a result of the second multiplication, or a subtraction of the final reference signal value from the reference signal value and a third multiplication of a result of the subtraction with a final square root value and then an addition of a final color-channel value.

Example 23 may include the at least one computer readable storage medium of any one of Examples 17 to 19, where setting the first weights, setting the second weights, and combining at least one of the one or more final restoration factors and the reference signal in the target pixel location is done only in selected pixel locations and/or for selected color channels, wherein the selected pixel locations and/or the selected color channels are variable.

Example 24 may include the at least one computer readable storage medium of any one of Examples 17 to 19, wherein the instructions, when executed, cause the computing device to enhance the restored values using one or more of noise reduction, sharpening, or detail restoration.

Example 25 may include a pixel restoration apparatus comprising means for creating a reference signal for a restoration process using a plurality of pixels corresponding to various color channels within a spatial neighborhood of a target pixel location, means for setting first weights in pixel locations within the spatial neighborhood to control contributions of pixel values and values of the reference signal in calculating one or more intermediate restoration factors, means for setting second weights in pixel locations within the spatial neighborhood to control contributions of the intermediate restoration factors in calculating one or more final restoration factors, and means for combining at least one of the one or more final restoration factors and the reference signal in the target pixel location to restore one or more values in the target pixel location.

Example 26 may include the apparatus of Example 25, wherein the reference signal is to be created using at least one predetermined filter mask, by combining local average or weighted average values corresponding to the various color channels, or by enlarging a weighted combination of different color pixels in non-overlapping or overlapping blocks.

Example 27 may include the apparatus of Example 26, further including means for enhancing the reference signal using one or more of noise reduction, sharpening, or detail restoration.

Example 28 may include the apparatus of any one of Examples 25 to 27, wherein the first and second weights are to be set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

Techniques described herein may produce high image quality at low-to-medium computational cost (depending on the configuration chosen and the use case), and support different RGB-IR sensors based on various CFA patterns. Additionally, techniques described herein may output the data in Bayer CFA or full-color RGB format to support various configurations and use cases, and may also be used to enhance the resolution of IR images. Furthermore, the techniques may be used for both video and still images and may serve as alternatives to solutions used for non-IR image sensors (e.g., those designed for the Bayer CFA patterns).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

I claim:

1. A system comprising:
   a network controller to obtain images;
   a memory subsystem communicatively coupled to the network controller, the memory subsystem to store the images; and
   a pixel restoration apparatus comprising:
      a reference signal manager to create a reference signal for a restoration process using a plurality of pixels corresponding to various color channels within a spatial neighborhood of a target pixel location,
      an intermediate factor controller communicatively coupled to the reference signal manager, the intermediate factor controller to set first weights in pixel locations within the spatial neighborhood to control contributions of pixel values and values of the reference signal in calculating one or more intermediate restoration factors,
      a final factor controller communicatively coupled to the reference signal manager and the intermediate factor controller, the final factor controller to set second weights in pixel locations within the spatial neighborhood to control contributions of the intermediate restoration factors in calculating one or more final restoration factors, and
      a result generator communicatively coupled to the final factor controller, the result generator to combine at least one of the one or more final restoration factors and the reference signal in the target pixel location to restore one or more values in the target pixel location.

2. The system of claim 1, wherein the reference signal is to be created using at least one predetermined filter mask, by combining local average or weighted average values corresponding to the various color channels, or by enlarging a weighted combination of different color pixels in non-overlapping or overlapping blocks.

3. The system of claim 2, wherein the reference signal generator includes a signal enhancer to enhance the reference signal using one or more of noise reduction, sharpening, or detail restoration.

4. The system of claim 1, wherein the first and second weights are to be set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

5. An apparatus comprising:
a reference signal manager to create a reference signal for a restoration process using a plurality of pixels corresponding to various color channels within a spatial neighborhood of a target pixel location;
an intermediate factor controller communicatively coupled to the reference signal manager, the intermediate factor controller to set first weights in pixel locations within the spatial neighborhood to control contributions of pixel values and values of the reference signal in calculating one or more intermediate restoration factors;
a final factor controller communicatively coupled to the reference signal manager and the intermediate factor controller, the final factor controller to set second weights in pixel locations within the spatial neighborhood to control contributions of the intermediate restoration factors in calculating one or more final restoration factors; and
a result generator communicatively coupled to the final factor controller, the result generator to combine at least one of the one or more final restoration factors and the reference signal in the target pixel location to restore one or more values in the target pixel location.

6. The apparatus of claim 5, wherein the reference signal is to be created using at least one predetermined filter mask, by combining local average or weighted average values corresponding to the various color channels, or by enlarging a weighted combination of different color pixels in non-overlapping or overlapping blocks.

7. The apparatus of claim 6, wherein the reference signal generator includes a signal enhancer to enhance the reference signal using one or more of noise reduction, sharpening, or detail restoration.

8. The apparatus of claim 5, wherein the first and second weights are to be set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

9. The apparatus of claim 5, wherein the intermediate and final restoration factors are to include one or more of weighted reference signal values, weighted square reference signal values, weighted pixel values, weighted square pixel values, weighted reference signal values multiplied with pixel values, weighted pixel differences between the pixel values and the values of the reference signals, pixel ratios between the pixel values and the values of the reference signal, scaling factors expressed as ratios between covariance and variance values, offsets expressed as a difference between weighted pixel values and weighted reference signal values multiplied with scaling factors, or square root values of ratios between variance values corresponding to the reference signal and variance values corresponding to the pixel values.

10. The apparatus of claim 5, wherein combining one or more final restoration factors and the reference signal in the target pixel is to include one of an addition of the reference signal to the final pixel difference, a first multiplication of the reference signal value by the final pixel ratio, a second multiplication of the reference signal value by the final scaling factor and then an addition of the final offset to a result of the second multiplication, or a subtraction of the final reference signal value from the reference signal value and a third multiplication of a result of the subtraction with a final square root value and then an addition of a final color-channel value.

11. The apparatus of claim 5, where setting the first weights, setting the second weights, and combining at least one of the one or more final restoration factors and the reference signal in the target pixel location is done only in selected pixel locations and/or for selected color channels, wherein the selected pixel locations and/or the selected color channels are variable.

12. The apparatus of claim 5, wherein the result generator includes a signal enhancer to enhance the restored values using one or more of noise reduction, sharpening, or detail restoration.

13. A method comprising:
creating a reference signal for a restoration process using a plurality of pixels corresponding to various color channels within a spatial neighborhood of a target pixel location;
setting first weights in pixel locations within the spatial neighborhood to control contributions of pixel values and values of the reference signal in calculating one or more intermediate restoration factors;
setting second weights in pixel locations within the spatial neighborhood to control contributions of the intermediate restoration factors in calculating one or more final restoration factors; and
combining at least one of the one or more final restoration factors and the reference signal in the target pixel location to restore one or more values in the target pixel location.

14. The method of claim 13, wherein the reference signal is created using at least one predetermined filter mask, by combining local average or weighted average values corresponding to the various color channels, or by enlarging a weighted combination of different color pixels in non-overlapping or overlapping blocks.

15. The method of claim 14, further including enhancing the reference signal using one or more of noise reduction, sharpening, or detail restoration.

16. The method of claim 13, wherein the first and second weights are set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

17. At least one non-transitory computer readable storage medium comprising a set of instructions which, when executed by a computing device, cause the computing device to:
create a reference signal for a restoration process using a plurality of pixels corresponding to various color channels within a spatial neighborhood of a target pixel location;
set first weights in pixel locations within the spatial neighborhood to control contributions of pixel values and values of the reference signal in calculating one or more intermediate restoration factors;

set second weights in pixel locations within the spatial neighborhood to control contributions of the intermediate restoration factors in calculating one or more final restoration factors; and combine at least one of the one or more final restoration factors and the reference signal in the target pixel location to restore one or more values in the target pixel location.

18. The at least one non-transitory computer readable storage medium of claim 17, wherein the reference signal is to be created using at least one predetermined filter mask, by combining local average or weighted average values corresponding to the various color channels, or by enlarging a weighted combination of different color pixels in non-overlapping or overlapping blocks.

19. The at least one non-transitory computer readable storage medium of claim 18, wherein the instructions, when executed, cause a computing device to enhance the reference signal using one or more of noise reduction, sharpening, or detail restoration.

20. The at least one non-transitory computer readable storage medium of claim 17, wherein the first and second weights are to be set using one or more of predetermined weights, pixel location-selective weights, weights reflecting a spatial distance between the target pixel location and the neighboring locations, or data-adaptive weights based on differences between values of the reference signal in the target pixel location and the neighboring pixel locations.

21. The at least one non-transitory computer readable storage medium of claim 17, wherein the intermediate and final restoration factors are to include one or more of weighted reference signal values, weighted square reference signal values, weighted pixel values, weighted square pixel values, weighted reference signal values multiplied with pixel values, weighted pixel differences between the pixel values and the values of the reference signals, pixel ratios between the pixel values and the values of the reference signal, scaling factors expressed as ratios between covariance and variance values, offsets expressed as a difference between weighted pixel values and weighted reference signal values multiplied with scaling factors, or square root values of ratios between variance values corresponding to the reference signal and variance values corresponding to the pixel values.

22. The at least one non-transitory computer readable storage medium of claim 17, wherein combining one or more final restoration factors and the reference signal in the target pixel is to include one of an addition of the reference signal to the final pixel difference, a first multiplication of the reference signal value by the final pixel ratio, a second multiplication of the reference signal value by the final scaling factor and then an addition of the final offset to a result of the second multiplication, or a subtraction of the final reference signal value from the reference signal value and a third multiplication of a result of the subtraction with a final square root value and then an addition of the final color-channel value.

23. The at least one non-transitory computer readable storage medium of claim 17, where setting the first weights, setting the second weights, and combining at least one of the one or more final restoration factors and the reference signal in the target pixel location is done only in selected pixel locations and/or for selected color channels, wherein the selected pixel locations and/or the selected color channels are variable.

24. The at least one non-transitory computer readable storage medium of claim 17, wherein the instructions, when executed, cause the computing device to enhance the restored values using one or more of noise reduction, sharpening, or detail restoration.

* * * * *